US012059908B2

(12) United States Patent
Yamashita et al.

(10) Patent No.: US 12,059,908 B2
(45) Date of Patent: Aug. 13, 2024

(54) HEAD UNIT, HEAD UNIT ADJUSTMENT METHOD, ATTACHING/DETACHING JIG AND HEAD UNIT EXCHANGE METHOD

(71) Applicant: SCREEN HOLDINGS CO., LTD., Kyoto (JP)

(72) Inventors: Shinsuke Yamashita, Kyoto (JP); Kazuhiko Asada, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 91 days.

(21) Appl. No.: 17/671,193

(22) Filed: Feb. 14, 2022

(65) Prior Publication Data

US 2022/0281247 A1 Sep. 8, 2022

(30) Foreign Application Priority Data

Mar. 8, 2021 (JP) ................................. 2021-036194
Jul. 28, 2021 (JP) ................................. 2021-122977

(51) Int. Cl.
*B41J 25/316* (2006.01)

(52) U.S. Cl.
CPC .................................. *B41J 25/316* (2013.01)

(58) Field of Classification Search
CPC ...................................................... B41J 25/316
See application file for complete search history.

(56) References Cited

U.S. PATENT DOCUMENTS

| | | | |
|---|---|---|---|
| 9,126,445 B1 | 9/2015 | Spence et al. | |
| 9,358,818 B2 | 6/2016 | Von Essen et al. | |
| 9,566,810 B2 | 2/2017 | Von Essen et al. | |
| 10,308,054 B2 | 6/2019 | Von Essen et al. | |
| 2010/0207980 A1* | 8/2010 | Kim ...................... | B41J 25/003 29/428 |
| 2011/0149000 A1 | 6/2011 | Albertalli et al. | |
| 2014/0168319 A1 | 6/2014 | Moreau et al. | |
| 2014/0237787 A1 | 8/2014 | Saito | |

(Continued)

FOREIGN PATENT DOCUMENTS

| | | | |
|---|---|---|---|
| EP | 2 969 570 | B1 | 11/2019 |
| JP | 5968632 | B2 | 8/2016 |

(Continued)

OTHER PUBLICATIONS

Partial European Search Report issued in corresponding European Patent Application No. 22159992.1-1014, dated Aug. 8, 2022.

(Continued)

*Primary Examiner* — Jason S Uhlenhake
(74) *Attorney, Agent, or Firm* — Rimon P.C.

(57) ABSTRACT

A head unit to be detachably arrayed in a predetermined array direction on a base member includes: an ink discharge head having a nozzle surface configured to discharge an ink; a head holder attachable to and detachable from the base member while holding the ink discharge head in a holding region; and a posture adjustment mechanism configured to adjust a posture of the nozzle surface with respect to the head holder by rotating the ink discharge head with respect to the head holder about an axis of rotation perpendicular to both a surface normal to the nozzle surface and the array direction in a state where the head holder is not attached to the base member.

15 Claims, 14 Drawing Sheets

(56) References Cited

U.S. PATENT DOCUMENTS

| | | | |
|---|---|---|---|
| 2014/0259595 | A1 | 9/2014 | Von Essen et al. |
| 2015/0022588 | A1 | 1/2015 | Rodriguez et al. |
| 2016/0375707 | A1 | 12/2016 | Elferink et al. |

FOREIGN PATENT DOCUMENTS

| | | | |
|---|---|---|---|
| JP | 6524173 | B2 | 6/2019 |
| WO | 2014/080906 | A1 | 5/2014 |

OTHER PUBLICATIONS

Extended European Search Report issued in corresponding European Patent Application No. 22159992.1-1014, dated Dec. 20, 2022.

* cited by examiner

HEAD UNIT, HEAD UNIT ADJUSTMENT METHOD, ATTACHING/DETACHING JIG AND HEAD UNIT EXCHANGE METHOD

CROSS REFERENCE TO RELATED APPLICATION

The disclosure of Japanese Patent Applications enumerated below including specifications, drawings and claims is incorporated herein by reference in its entirety:

No. 2021-036194 filed on Mar. 8, 2021; and

No. 2021-122977 filed on Jul. 28, 2021.

BACKGROUND OF THE INVENTION

1. Field of Invention

This invention relates to a head unit to be detachably arrayed in a predetermined array direction with respect to a base member, and an adjustment method, an attaching/detaching jig and an exchange method for head unit.

2. Description of the Related Art

A printing apparatus is known which prints an image on the upper surface of a printing medium by discharging a water-based or oil-based ink or the like to the printing medium from nozzle surfaces of ink discharge heads by an inkjet method. In this printing apparatus, for example, as described in JP 6524173B, a plurality of fluid discharge modules are arrayed in a predetermined direction and mounted on a frame (corresponding to a "base member" of the invention). More particularly, a module mount assembly (corresponding to an "ink discharge head" of the invention) is formed by joining the fluid discharge module to a module mount. In this way, a plurality of the module mount assemblies are prepared. On the other hand, a plurality of clamp assemblies are mounted on the frame and the clamp assemblies are aligned using an alignment jig. Then, the module mount assemblies are mounted one-to-one on the clamp assemblies.

SUMMARY OF THE INVENTION

In the conventional art, the plurality of module mount assemblies are aligned with each other by aligning the clamp assemblies. However, what directly affects print quality is the alignment of the nozzle surfaces and this point is not sufficiently considered in the conventional art. That is, the fluid discharge modules are merely joined to the module mounts and the postures and positions of the nozzle surfaces of the fluid discharge modules are not constantly aligned before mounting on the frame. Further, since it is difficult to highly accurately adjust the postures and positions of the nozzle surfaces for each nozzle surface in a state mounted on the frame, automatic adjustment is performed, utilizing biasing forces of springs incorporated in the clamp assemblies in the apparatus of JP 6524173B. However, there is a limit to adjustment accuracy in this adjustment method. Further, the adjustment has been disrupted due to the action of an external force on the nozzle surfaces at the time of head cleaning in some cases. Due to these, discharge performance such as a discharge direction and a discharge position becomes inconsistent for each nozzle surface, with the result that there has been a problem of not being able to obtain sufficient print quality.

Further, in the case of arranging the plurality of module mount assemblies side by side in the array direction as in the conventional art, intervals between the module mount assemblies adjacent to each other are narrow. Thus, to exchange one of the plurality of module mount assemblies, it is necessary to selectively remove the module mount assembly to be exchanged and attach a new module mount assembly at a removed position where the module mount assembly was removed. However, since the exchange of the module mount assembly has depended on a visual check by an operator, it has been difficult to precisely mount the module mount assembly at the removed position, which adversely affected print quality in some cases. Note that, besides a reduction in print quality, the module mount assembly being attached or detached is broken only if a removing direction or inserting direction of the module mount assembly is slightly shifted. Thus, advanced work has been required to exchange the module mount assembly.

This invention was developed in view of the above problem and aims to provide a head unit having excellent print quality and an adjustment method, an attaching/detaching jig and an exchange method for head unit.

A first aspect of the invention is a head unit to be detachably arrayed in a predetermined array direction on a base member, the head unit comprising: an ink discharge head having a nozzle surface configured to discharge an ink; a head holder attachable to and detachable from the base member while holding the ink discharge head in a holding region; and a posture adjustment mechanism configured to adjust a posture of the nozzle surface with respect to the head holder by rotating the ink discharge head with respect to the head holder about an axis of rotation perpendicular to both a surface normal to the nozzle surface and the array direction in a state where the head holder is not attached to the base member.

A second aspect of the invention is a head unit to be detachably arrayed in a predetermined array direction on a base member, the head unit comprising: an ink discharge head having a nozzle surface configured to discharge an ink; a head holder attachable to and detachable from the base member while holding the ink discharge head in a holding region; and a height adjustment mechanism configured to adjust a height position of the nozzle surface with respect to the head holder by moving the ink discharge head with respect to the head holder in a height direction parallel to a surface normal to the nozzle surface in a state where the head holder is not attached to the base member.

A third aspect of the invention is a head unit adjustment method for adjusting a head unit to be detachably arrayed in a predetermined array direction on a base member, the method comprising: (a) inserting an ink discharge head having a nozzle surface configured to discharge an ink into a holding region of a head holder; (b1) adjusting a posture of the nozzle surface with respect to the head holder by rotating the ink discharge head inserted into the holding region with respect to the head holder about an axis of rotation perpendicular to a surface normal to the nozzle surface and the array direction; and (c) fixing the ink discharge head to the head holder to form the head unit after the step (b1) is performed, the operation (a), the operation (b1) operation and the (c) operation performed before the head unit is attached to the base member.

A fourth aspect of the invention is a head unit adjustment method for adjusting a head unit to be detachably arrayed in a predetermined array direction with respect to a base member, the method comprising: (a) inserting an ink discharge head having a nozzle surface configured to discharge an ink into a holding region of a head holder; (b2) adjusting a height position of the nozzle surface with respect to the head holder by moving the ink discharge head inserted into the holding region with respect to the head holder in a height direction parallel to a surface normal to the nozzle surface; and (c) fixing the ink discharge head to the head holder so as to form the head unit after the operation (b2) is performed, the operation (a), the operation (b1) operation and the (c) operation performed before the head unit is attached to the base member.

A fifth aspect of the invention is an attaching/detaching jig for attaching and detaching a plurality of head units to be mounted side by side in an array direction on a base member one by one to and from the base member, the jig comprising: a jig body including a guide member extending in a sliding direction orthogonal to the array direction, the jig body being attachable to and detachable from the base member; and a slider supported movably in the sliding direction along the guide member while supporting the head unit.

A sixth aspect of the invention is a head unit exchange method for exchanging a first head unit to a second head unit, out of a plurality of head units mounted side by side in an array direction on a base member, the method comprising: attaching the jib body to the base member such that the slider of the attaching/detaching jig faces the first head unit; supporting the first head unit by the slider; moving the slider supporting the first head unit to a separated position separated from the base member in the sliding direction; placing the second head unit on the slider after the first head unit is removed from the slider at the separated position; locating the second head unit at an exchange position where the first head unit was mounted by moving the slider supporting the second head unit to the base member; and attaching the second head unit to the base member at the exchange position and removing the attaching/detaching jig from the base member.

As described above, according to the invention, the posture and height position of the nozzle surface with respect to the head holder can be adjusted in the head unit in the unattached state where the head unit is not attached to the base member, and excellent print quality is obtained.

Further, since the above adjusted head unit can be stably attached to and detached from the base member, excellent print quality is obtained also in a state where the head unit is attached to the base member.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

DETAILED DESCRIPTION OF THE PREFERRED EMBODIMENTS

Figure 1:
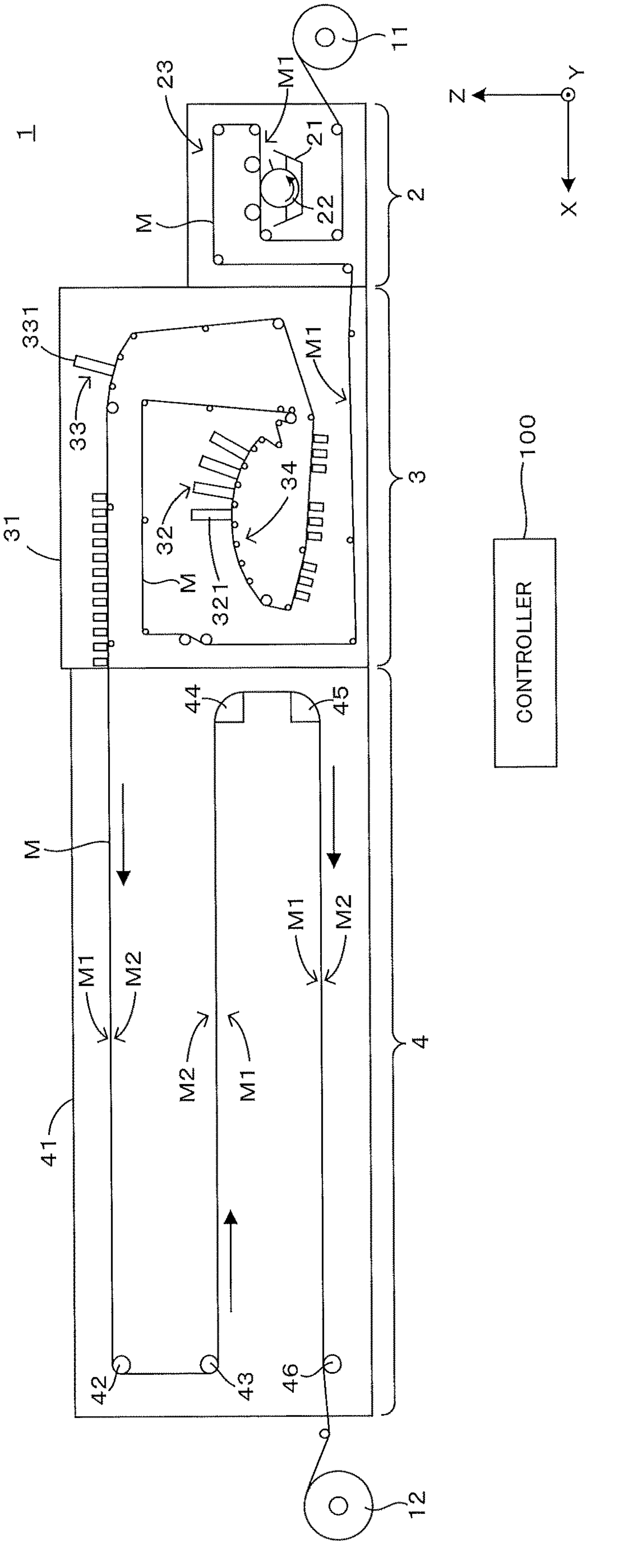
FIG. 1 is a front view schematically showing an example of a printing system equipped with one embodiment of a head unit according to the invention.

FIG. 1 is a front view schematically showing an example of a printing system equipped with one embodiment of a head unit according to the invention. In FIG. 1 and subsequent figures, a horizontal direction in which a coating apparatus 2, a printing apparatus 3 and a drying apparatus 4 constituting a printing system 1 are arranged is referred to as an "X direction", a horizontal direction from a right side toward a left side of FIG. 1 is referred to as a "+X direction" and an opposite direction is referred to as a "−X direction" to clarify an arrangement relationship of each component of the apparatus. Further, out of horizontal directions Y orthogonal to the X direction, a direction forward of the apparatuses is referred to as a "+Y direction" and a direction backward of the apparatuses is referred to as a "−Y direction". Further, upward and downward directions along a vertical direction Z are respectively referred to as a "+Z direction" and a "−Z direction".

This printing system 1 applies a coating process, a printing process and a drying process to a printing medium M while conveying the printing medium M in the form of a long strip from a feeding roll 11 to a winding roll 12 in a roll-to-roll manner by controlling each component of the apparatuses by a controller 100. That is, the coating apparatus 2 applies a coating liquid to the printing medium M. Then, the printing apparatus 3 prints an image by causing various inks to adhere to the printing medium M in an ink-jet method. Further, the drying apparatus 4 dries the inks adhering to the printing medium M. Note that a material of the printing medium M is a film made of OPP (oriented polypropylene), PET (polyethylene terephthalate) or the like. However, the material of the printing medium M is not limited to the film and may be paper or the like. Such a printing medium M is flexible. Further, out of both surfaces of the printing medium M, the surface on which images are to be printed is referred to as a front surface M1 and the surface opposite to the front surface M1 is referred to as a back surface M2 as appropriate.

The coating apparatus 2 includes a pan 21 storing a liquid primer (coating liquid), a gravure roller 22 partially immersed in the primer stored in the pan 21 and a conveying unit 23 conveying the printing medium M. In the coating apparatus 2, a coating region is provided where the gravure roller 22 contacts the printing medium M conveyed by the conveying unit 23 from below, and the conveying unit 23 conveys the printing medium M along the coating region with the front surface M1 of the printing medium M facing down. On the other hand, the gravure roller 22 supplies the primer to the coating region by rotating while holding the primer on the peripheral surface thereof. In this way, the primer supplied by the gravure roller 22 is applied to the front surface M1 of the printing medium M in the coating region. Further, in the coating region, a moving direction of the printing medium M and a rotating direction of the peripheral surface of the gravure roller 22 are opposite. That is, the primer is applied to the printing medium M by a reverse kiss method. Then, the conveying unit 23 carries out the printing medium M from the coating apparatus 2 to the printing apparatus 3 with the front surface M1 of the printing medium M having the primer applied thereto facing up.

The printing apparatus 3 includes a housing 31, a color printing unit 32 arranged in the housing 31, a white printing unit 33 arranged above the color printing unit 32 in the housing 31, and a conveying unit 34 conveying the printing medium M by a plurality of rollers arranged in the housing 31.

The color printing unit 32 includes a plurality of (four) printing bar units 321 arrayed in the moving direction (direction from the other side X2 toward the one side X1) of the printing medium M above the printing medium M conveyed by the conveying unit 34. The plurality of printing bar units 321 include nozzles facing the front surface M1 of the printing medium M passing therebelow from above, and discharge color inks of mutually different colors from the nozzles by the ink-jet method. Here, the color inks mean inks other than a white ink and include inks of cyan, magenta, yellow, black and the like. In this way, the plurality of printing bar units 321 of the color printing unit 32 print a color image on the front surface M1 of the printing medium M by discharging the color inks to the front surface M1 of the printing medium M passing therebelow from above.

Further, the white printer 33 includes a single printing bar unit 331 arranged above the printing medium M conveyed by the conveyor 34. The printing bar unit 331 includes nozzles facing the front surface M1 of the printing medium M passing therebelow and discharges a white ink from the nozzles by an inkjet method. In this way, the printing bar unit 331 of the white printer 33 prints a white image on the front surface M1 of the printing medium M by discharging the white ink to the front surface M1 of the printing medium M passing therebelow from above.

The printing bar unit 321, 331 is composed of a plurality of ink discharge heads for discharging the ink from nozzle surfaces by an inkjet method. In this embodiment, ten ink discharge heads are arranged in the width direction Y of the printing medium M. That is, the width direction Y corresponds to an "array direction" of the invention. The detailed configuration of the printing bar unit 321, 331 and the adjustment and exchange of each ink discharge head are described in detail later.

Note that, although not shown in FIG. 1, two types of dryers are provided in the housing 31 of the printing apparatus 3. One dryer is a pre-dryer for drying the color inks adhered to the surface M1 of the printing medium M by the color printer 32. The other dryer is an upper dryer for drying the white ink adhered to the surface M1 of the printing medium M by the white printer 33.

The drying apparatus 4 dries the inks adhering to the surface M1 of the printing medium M being conveyed from the printing apparatus 3. The drying apparatus 4 includes a housing 41 (drying furnace). Further, in the housing 41, rollers 42, 43 and 46 are arranged on a (+X) side and air turn bars 44, 45 are arranged on a (−X) side. By this arrangement, a substantially S-shaped conveyance path when viewed from a (+Y) side is configured, and the printing medium M is conveyed along this conveyance path. The inks adhering to the surface M1 of the printing medium M are dried during this conveyance. Then, the printing medium M subjected to the drying process is carried out from the drying apparatus 4 and wound on the winding roll 12.

Figure 2:
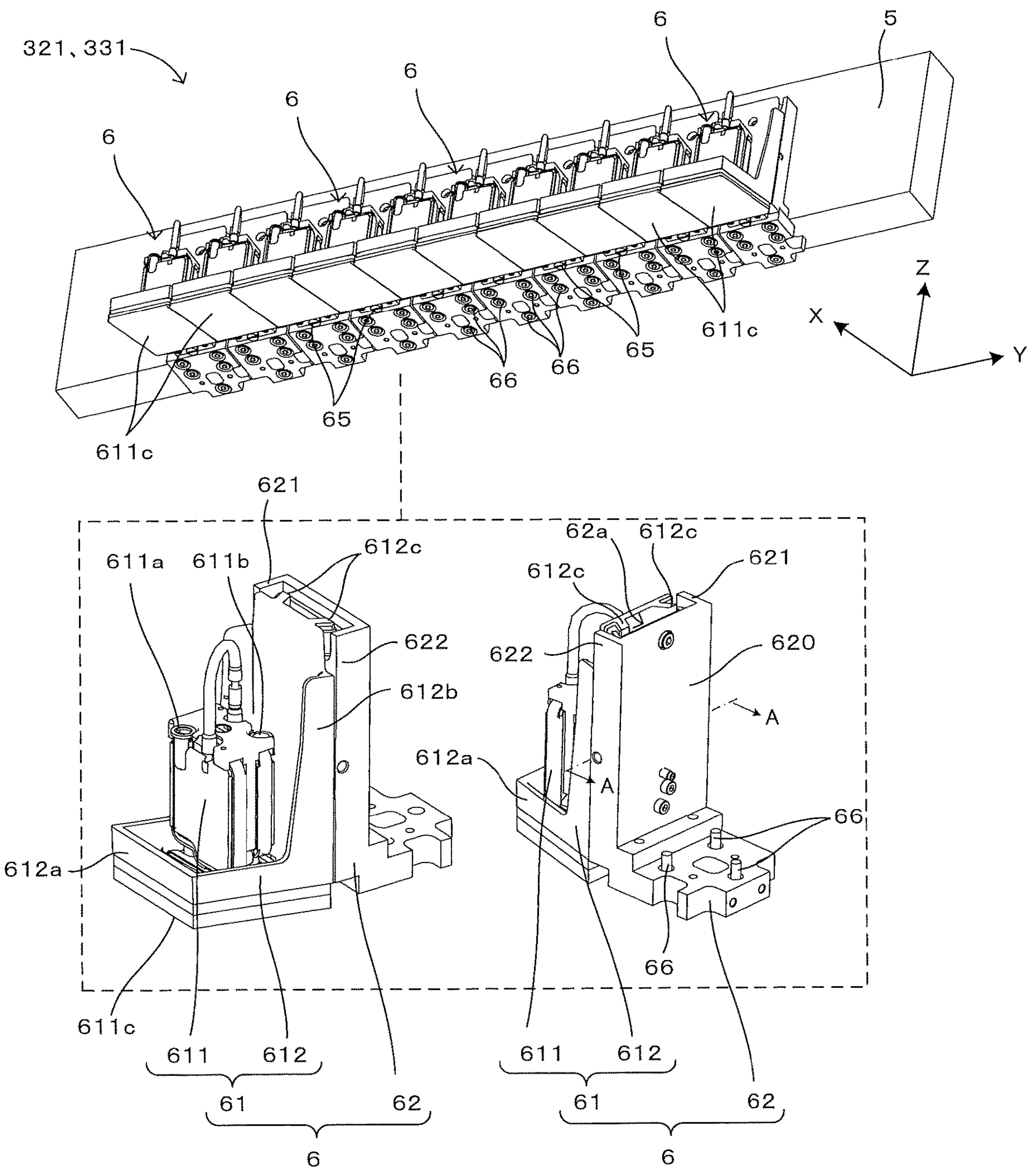
FIG. 2 is a perspective view showing a main part of the printing bar unit.

FIG. 2 is a perspective view showing a main part of the printing bar unit. In the printing bar unit 321, 331, ten head units 6 are adjacently mounted in the array direction Y on a base member 5 extending in the array direction Y. As shown in a partial enlarged view of FIG. 2, each head unit 6 is such that the ink discharge head 61 is held by a head holder 62, and fixed by fixing screws 65 after a posture adjustment and a height adjustment.

Figure 3:
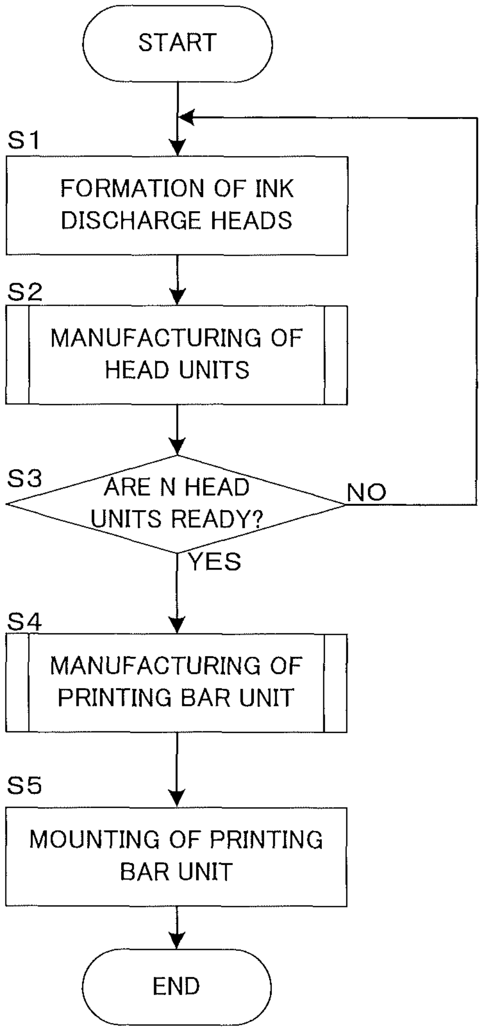
FIG. 3 is a flow chart showing a manufacturing method of the printing bar unit shown in FIG. 2.

FIG. 3 is a flow chart showing a manufacturing method of the printing bar unit shown in FIG. 2. In manufacturing the printing bar unit 321, 331, an operator performs Steps S1 to S5 shown in FIG. 3. The formation of the ink discharge heads 61, the manufacturing of the head units 6 and the attachment of the head units 6 are described while the configuration of the head units 6 is described as appropriate. First, by repeatedly performing Steps S1 to S5 by a mounting number N of the head units 6 in the printing bar unit 321, 331, the head units 6 are prepared. Note that N=10 in this embodiment to mount ten head units 6 for each printing bar unit, but the value of N is arbitrary.

Figure 4:
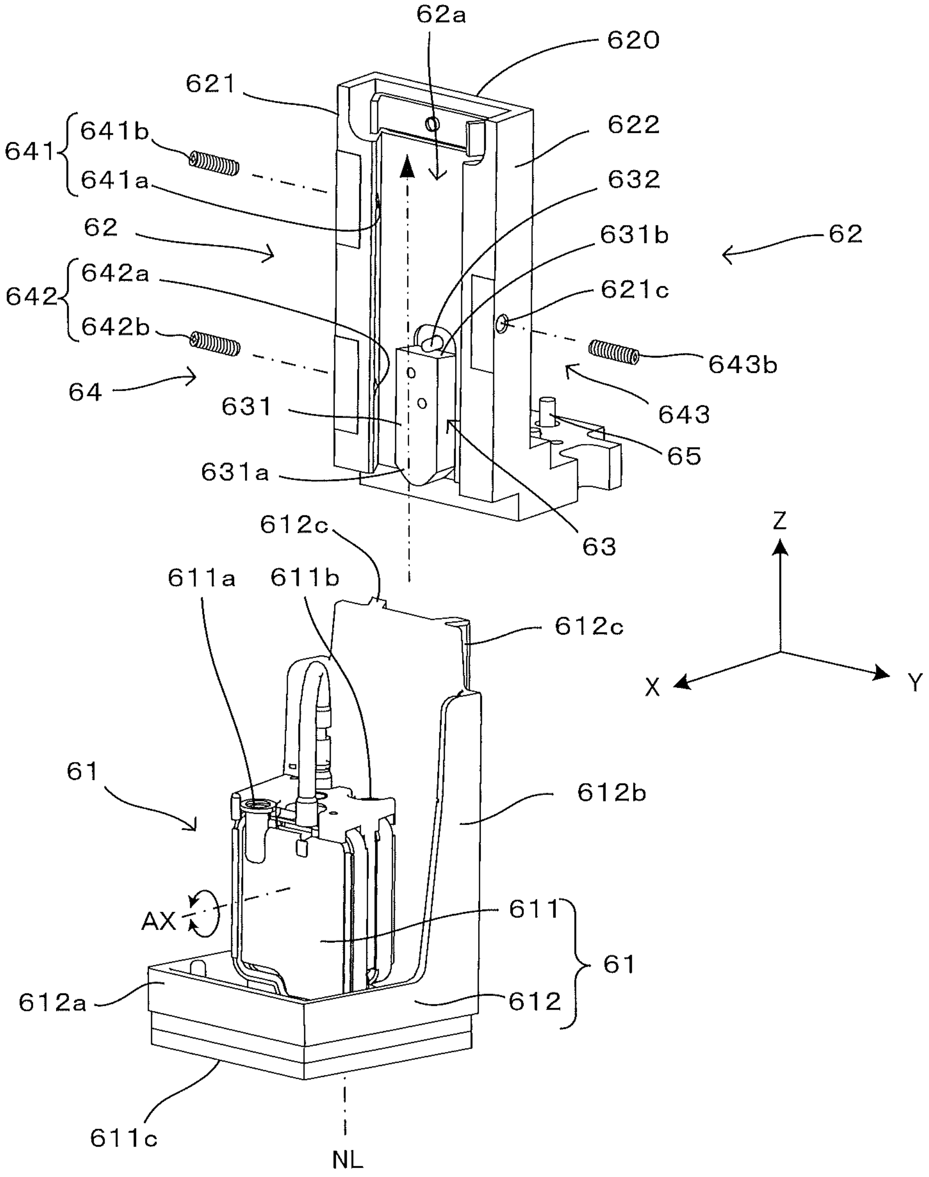
FIG. 4 is an exploded assembly perspective view of the head unit.
Figure 5:
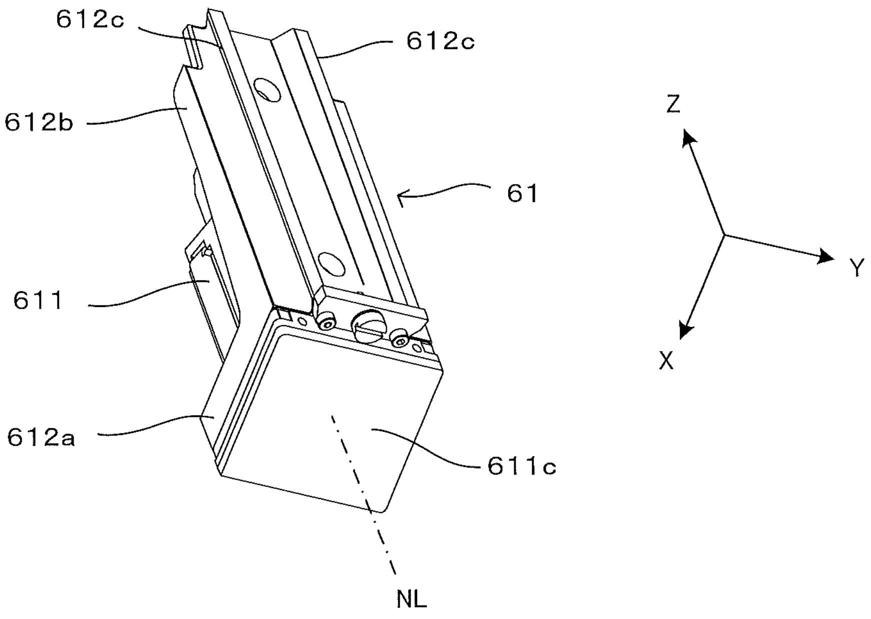
FIG. 5 is a perspective view of the ink discharge head viewed from a back rear side.

FIG. 4 is an exploded assembly perspective view of the head unit. FIG. 5 is a perspective view of the ink discharge head viewed from a back rear side. The ink discharge head 61 and the head holder 62 constituting the head unit 6 are respectively structured as follows, and the ink discharge head 61 is insertable into a holding region 62*a* of the head holder 62. Here, the printing bar unit 321, 331 is so arranged that nozzle surfaces 611*c* for discharging the ink face the surface M1 (FIG. 1) of the printing medium M. Accordingly, directions of a surface normal NL (FIG. 5) to the nozzle surface 611*c* and a surface normal to the surface M1 do not constantly coincide with the vertical direction Z. However, to facilitate the understanding of the contents of the invention, description is given below, assuming that the direction of the surface normal NL substantially coincides with the vertical direction Z and the direction Z corresponds to a "height direction" of the invention.

As shown in FIGS. 2 and 4, the ink discharge head 61 includes an ink discharge module 611 and a module mount 612. The ink discharge module 611 has a function to discharge the ink circulated and supplied via an ink inflow port 611*a* and an ink outflow port 611*b* downward (−Z) from the nozzle surface 611*c* in the form of liquid droplets as conventionally known. On the other hand, the module mount 612 includes a horizontal part 612*a* facing the printing medium M and a vertical part 612*b* standing upward from an end part in the (−X) direction of the horizontal part 612*a* and has a substantially L-shaped cross-sectional structure. The horizontal part 612*a* is provided with a rectangular opening (not shown) slightly narrower than the nozzle surface 611*c* and has a frame shape in a plan view from above. Thus, if the ink discharge module 611 is inserted upward (+Z) via the rectangular opening with the nozzle surface 611*c* facing downward, the ink discharge module 611 is locked by a frame edge part of the horizontal part 612*a* while exposing the nozzle surface 611*c* downward. Then, the ink discharge module 611 is fixed to the module mount 612. In this way, the ink discharge module 611 and the module mount 612 are integrated to form the ink discharge head 61 (Step S1).

In the thus formed ink discharge head 61, a pair of projecting parts 612*c* project in the (−X) direction on a vertical surface on a (−X) side of the vertical part 612*b* as shown in FIG. 5. This pair of projecting parts 612*c* extend in the vertical direction Z and are finished into a shape fittable to the head holder 62. Thus, as shown in FIG. 4, the ink discharge head 61 can be stably inserted into the holding region 62*a* of the head holder 62 from below. Of course, the ink discharge head 61 and the head holder 62 can also be integrated by moving the head holder 62 toward the ink discharge head 61 from above.

As shown in FIG. 4, the head holder 62 includes a holder base 620 extending in the vertical direction Z, a first holder member 621 extending in the vertical direction Z on a (−Y) side of the holder base 620 and a second holder member 622 extending in the vertical direction Z on a (+Y) side of the holder base 620. A region surrounded by these holder base 620, first holder member 621 and second holder member 622 corresponds to the holding region 62*a*, and the ink discharge head 61 can be held in this holding region 62*a*.

A height adjustment mechanism 63 for adjusting a relative height position, i.e. a relative position, of the nozzle surface 611*c* with respect to the head holder 62 is mounted in a central lower part of the holder base 620 as shown in FIG. 4. Further, a posture adjustment mechanism 64 for adjusting the posture of the nozzle surface 611*c* is mounted on the first and second holder members 621, 622.

The height adjustment mechanism 63 includes a movable member 631 provided movably in the vertical direction Z along a side surface on a (+X) side of the holder base 620 and a round tip screw 632 functioning as a mover for moving the movable member 631 in the height direction Z. The movable member 631 corresponds to an example of a "fourth movable member" of the invention, and a lower end part 631*a* thereof is finished into a shape projecting downward. On the other hand, an upper end part 631*b* of the movable member 631 is finished into an inclined surface inclined with respect to the height direction Z, and higher on the (+X) side (left side of FIG. 8) than on a (−X) side (right side of FIG. 8) as shown in an enlarged view in FIG. 8 to be described later. Further, the round tip screw 632 is screwed into the holder base 620 from the (−X) side, and a tip part of the round tip screw 632 advances in the (+X) direction while sliding on the inclined surface by the operator rotating the round tip screw 631 clockwise. As a result, the movable member 631 is moved downward (−Z). Conversely, the round tip screw 632 retreats in the (−X) direction by the operator rotating the round tip screw 631 counterclockwise, whereby the movable member 631 can be moved upward (+Z). That is, the position of the movable member 631 in the horizontal direction Z can be controlled according to a rotation amount of the round tip screw 632 and the relative height position (relative position) of the nozzle surface 611*c* with respect to the head holder 62 can be adjusted at the time of manufacturing the head unit 6 to be described later.

The posture adjustment mechanism 64 includes two movable members 641, 642 to be mounted into the first holder member 621 and one movable member 643 to be mounted into the second holder member 622. These three movable members 641 to 643 basically have the same configuration and only the mounting positions thereof are different from each other.

The movable member 641 is composed of a ball 641*a* and a set screw 641*b* made of stainless or resin and to be inserted into a through hole 621*a* (FIG. 7) penetrating in the Y direction at an upper position of the first holder member 621. The ball 641*a* is arranged movably in the array direction Y in the through hole 621*a*. Further, the set screw 641*b* is provided movably back and forth in the array direction Y while being threadably engaged with an internal thread provided on the inner peripheral surface of the through hole 621*a* on a (−Y) side of the ball 641*a*. Thus, if the operator rotates and moves the set screw 641*b* in the array direction Y, an amount (hereinafter, referred to as a projection amount) of the set screw 641*b* projecting from an opening on a (+Y) side of the through hole 621*a* toward the holding region 62*a* changes according to a movement of the set screw 641*b*. That is, a push-in amount of the ball 641*a* to the ink discharge head 61 located in the holding region 62*a* can be adjusted according to a rotation amount of the set screw 641*b*.

The movable member 642 is composed of a ball 642*a* and a set screw 642*b* to be inserted into a through hole 621*b* (FIG. 7) penetrating in the Y direction at a position separated downward from the movable member 641 (lower position of the first holder member 621). Thus, if the operator rotates and moves the set screw 642*b* in the array direction Y, a projection amount of the set screw 642*b* projecting from an opening on a (+Y) side of the through hole 621*b* changes according to a movement of the set screw 642*b*. That is, a push-in amount of the ball 642*a* to the ink discharge head 61 located in the holding region 62*a* can be adjusted according to a rotation amount of the set screw 642*b*.

The movable member 643 is composed of a ball 643*a* (FIG. 7) and a set screw 643*b* to be inserted into a through hole 621*c* penetrating in the Y direction at a center position of the second holder member 622. This "center position" means a position facing an intermediate part of the first holder member 621 located between the movable members 641 and 642. Thus, if the operator rotates and moves the set screw 643*b* in the array direction Y, a projection amount of the set screw 643*b* projecting from an opening on a (−Y) side of the through hole 621*c* changes according to a movement of the set screw 643*b*. That is, a push-in amount of the ball 643*a* to the ink discharge head 61 located in the holding region 62*a* can be adjusted according to a rotation amount of the set screw 643*b*.

By adjusting the push-in amounts to the ink discharge head 61 at three positions different from each other in this way, the posture of the nozzle surface 611*c* with respect to the head holder 62 can be adjusted. For example, if the projection amount of one of the movable members 641, 642 into the holding region 62*a* is increased and the projection amount of the other into the holding region 62*a* is reduced, the ink discharge head 61 can be rotated about an axis of rotation AX parallel to a direction (X direction) perpendicular to both the surface normal NL to the nozzle surface 611*c* and the array direction Y with respect to the head holder 62 as shown in FIG. 4. In this way, the posture of the nozzle surface 611*c* can be accurately adjusted in a YZ plane.

Further, by increasing the projection amounts of the movable members 641, 642 and reducing the projection amount of the movable member 643, the ink discharge head 61 moves toward the second holder member 622 (toward +Y side). Conversely, by reducing the projection amounts of the movable members 641, 642 and increasing the projection amount of the movable member 643, the ink discharge head 61 moves toward the first holder member 622 (toward −Y side). In this way, the position of the nozzle surface 611*c* in the array direction Y can be accurately adjusted.

The head unit 6 is manufactured by the operator fitting the ink discharge head 61 formed in Step S1 to the thus configured head holder 62 (Step S2). The manufacturing of the head unit 6 is described below with reference to FIGS. 4 to 8.

Figure 6:
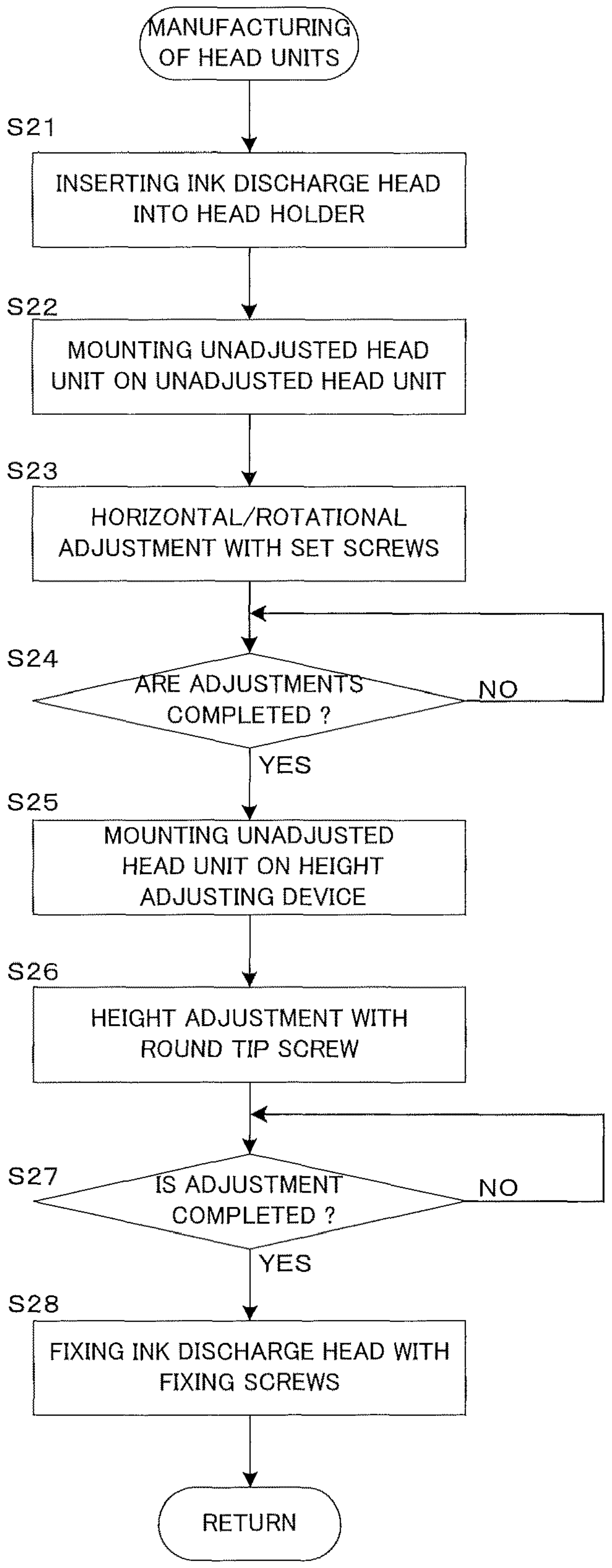
FIG. 6 is a flow chart showing an operation procedure of manufacturing the head unit.
Figure 7:
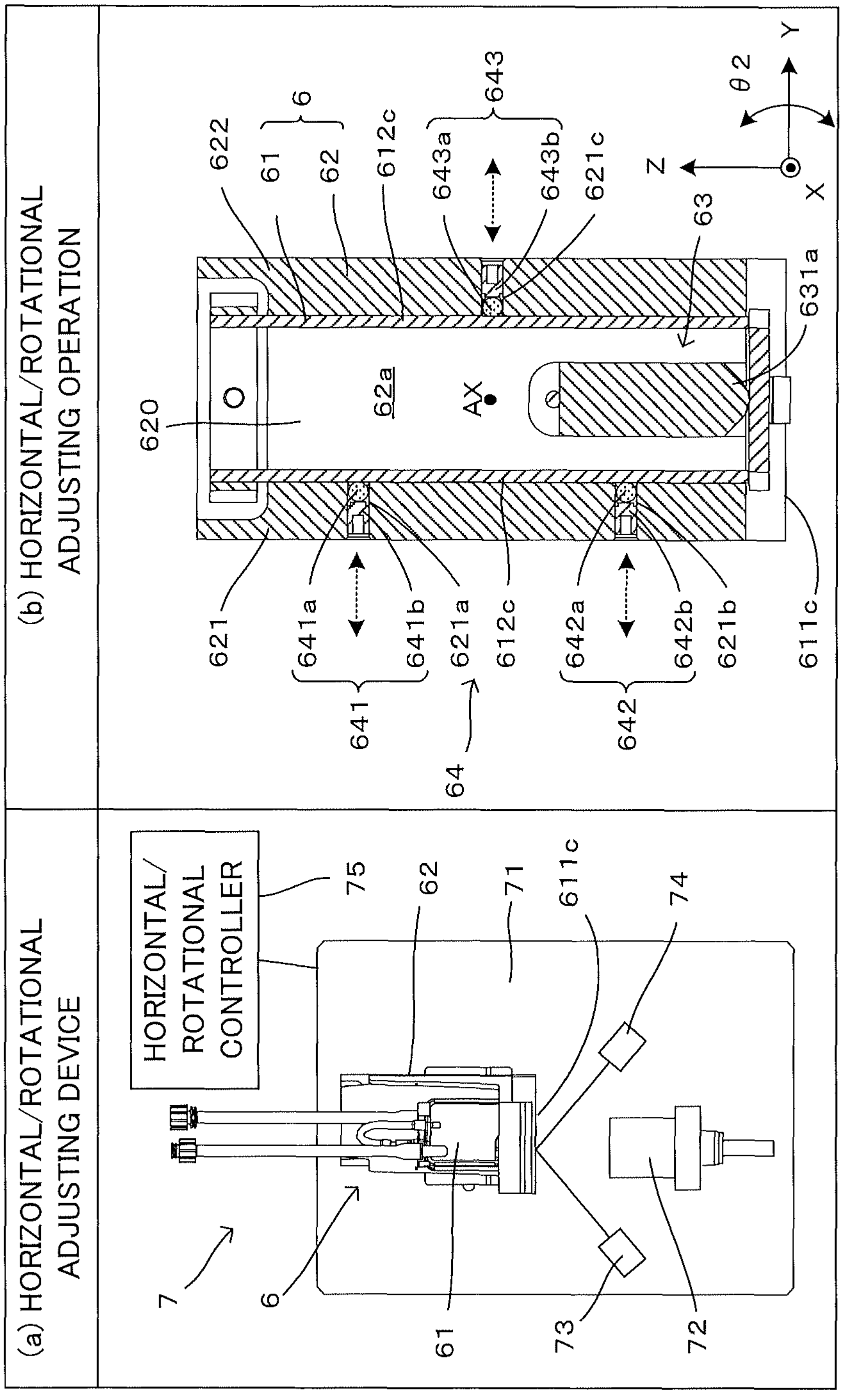
FIG. 7 is a chart schematically showing a horizontal/rotational adjusting operation performed in the manufacturing of the head unit.
Figure 8:
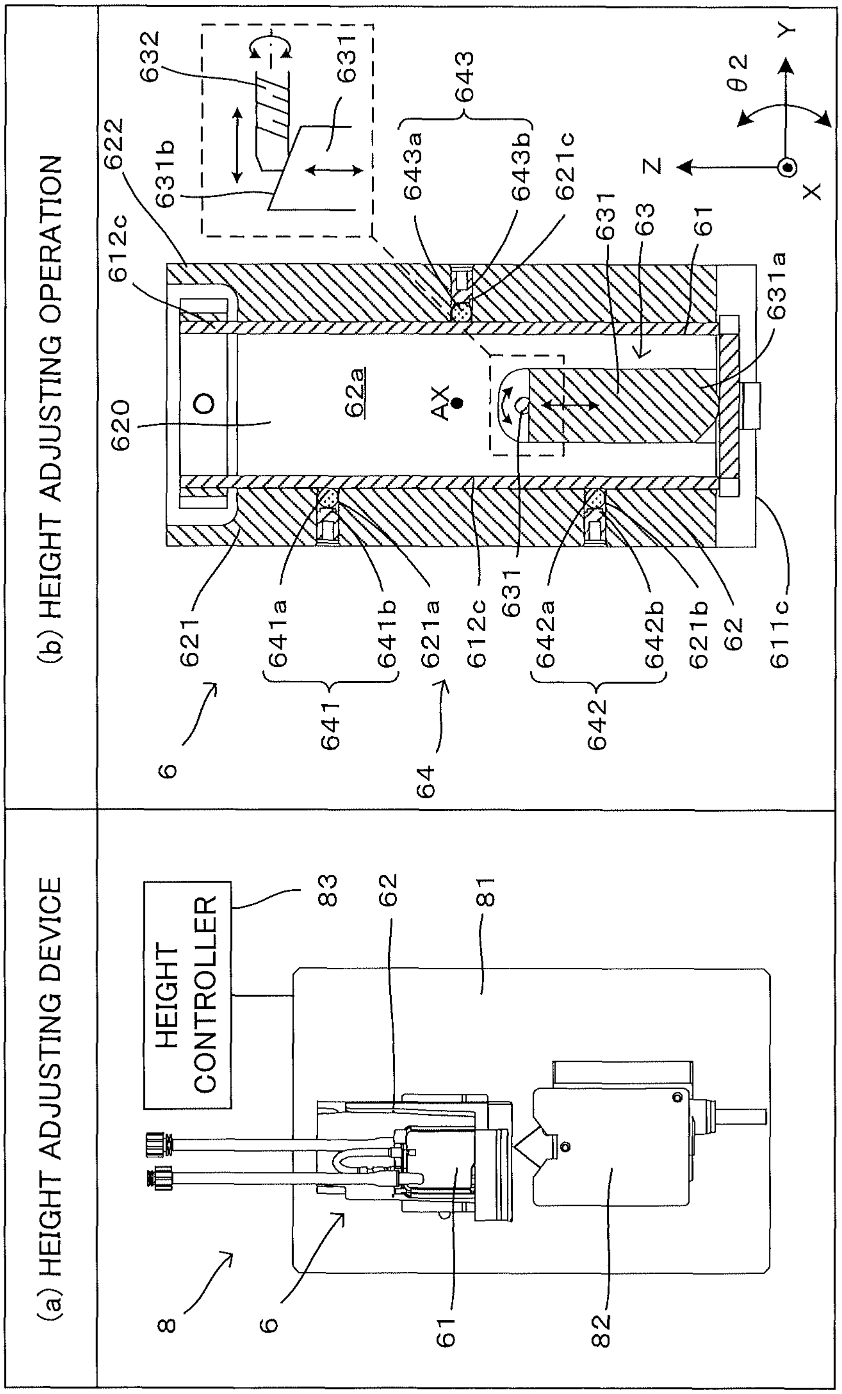
FIG. 8 is a chart schematically showing a height adjusting operation performed in the manufacturing of the head unit.

FIG. 6 is a flow chart showing an operation procedure of manufacturing the head unit. FIG. 7 is a chart schematically showing a horizontal/rotational adjusting operation performed in the manufacturing of the head unit. FIG. 8 is a chart schematically showing a height adjusting operation performed in the manufacturing of the head unit. As shown in FIG. 4, the ink discharge head 61 is inserted into the holding region 62*a* of the head holder 62 while the pair of projecting parts 612*c* are caused to slide in contact with the holder members 621, 622 (Step S21). In this way, the ink discharge head 61 is integrated with the head holder 62 with a certain accuracy. In the thus integrated head unit 6, the positioning accuracy of the nozzle surface 611*c* with respect to the head holder 62 is not sufficient to ensure required print quality. Accordingly, in this embodiment, the positioning accuracy is enhanced by performing the horizontal/rotational adjusting operation (Steps S22 to S24) and the height adjusting device (Steps S25 to S27). The head unit 6 before the both adjusting operations are completed is called an “unadjusted head unit 6”. Note that a sequence of the horizontal/rotational adjusting operation and the height adjusting device for the unadjusted head unit 6 is arbitrary, but the horizontal/rotational adjusting operation using the horizontal/rotational adjusting device 7 is first performed in this embodiment.

Here, prior to the description of the horizontal/rotational adjusting operation, the configuration of the horizontal/rotational adjusting device 7 is described. As shown in a field (a) of FIG. 7, the horizontal/rotational adjusting device 7 includes a device base 71, an imager 72, a projector 73, a light receiver 74 and a horizontal/rotational controller 75. A side view showing a state where the unadjusted head unit 6 is mounted on the horizontal/rotational adjusting device 7 when viewed from the X direction is shown in the field (a) of FIG. 7, and a sectional view of the unadjusted head unit 6 in a mounted state is shown in a field (b) of FIG. 7. As shown in the field (a) of FIG. 7, a holding mechanism (not shown) for holding the head holder 62 of the unadjusted head unit 6 at a predetermined position is provided on the device base 71, and the unadjusted head unit 6 is attachable to and detachable from the device base 71 with the nozzle surface 611 facing downward. When the unadjusted head unit 6 is mounted on the device base 71, the head holder 62 is positioned at a reference position.

The imager 72, the projector 73 and the light receiver 74 are arranged below the unadjusted head unit 6 mounted on the device base 71. The imager 72 images the nozzle surface 611*c* and the periphery thereof, and outputs a signal of a captured image to the horizontal/rotational controller 75. The horizontal/rotational controller 75 having receiving this signal displays this image on a display (not shown) of the horizontal/rotational controller 75. Thus, the operator can confirm the current position of the nozzle surface 611*c* and the posture of the nozzle surface 611*c* in an XY plane by observing the image on the display.

The projector 73 irradiates light at a certain incident angle (e.g. 45°) to the nozzle surface 611*c* in a YZ plane (plane of FIG. 7) in response to a lighting command of the horizontal/rotational controller 75. On the other hand, the light receiver 74 receives the reflected light reflected by the nozzle surface 611*c* and outputs information on a light reception position to the horizontal/rotational controller 75. The horizontal/rotational controller 75 having received this information calculates a rotation angle θ2 of the nozzle surface 611*c* about the axis of rotation AX parallel to the X direction based on the information on the light reception position, and displays that calculated value on the display. Thus, the operator can precisely grasp the rotation angle θ2 of the nozzle surface 611*c* by confirming a numerical value on the display.

To perform the horizontal/rotational adjusting operation using the horizontal/rotational adjusting device 7, the operator mounts the unadjusted head unit 6 on the device base 71 as shown in FIG. 7 (Step S22). Subsequent to that, when the operator instructs the start of an adjustment to the horizontal/rotational controller 75, the entire image of the nozzle surface 611*c* and the value of the rotation angle θ2 of the nozzle surface 611*c* are displayed on the display as described above. In this way, the operator grasps the current position of the nozzle surface 611*c* and the rotation angle θ2 of the nozzle surface 611*c* and performs a horizontal/rotational adjustment by advancing or retreating all or some of the set screws 6431*b* to 643*b* in the Y direction if necessary (Step S23). Note that specific methods for performing the horizontal position adjustment of the nozzle surface 611*c* in the array direction Y and the rotational adjustment of the nozzle surface 611*c* about the axis of rotation AX are as already described. When these adjustments are completed (“YES” in Step S24), the unadjusted head unit 6 is removed from the device base 71 and a transition is made to the height adjusting operation.

Next, prior to the description of the height adjusting device, the configuration of the height adjusting device 8 is described. As shown in a field (a) of FIG. 8, the height adjusting device 8 includes a device base 81, a length meter 82 and a height controller 83. A side view showing a state where the unadjusted head unit 6 is mounted on the height adjusting device 8 when viewed from the X direction is shown in the field (a) of FIG. 8, and a sectional view of the unadjusted head unit 6 in a mounted state is shown in a field (b) of FIG. 8. As shown in the field (a) of FIG. 8, a holding mechanism (not shown) for holding the head holder 62 of the unadjusted head unit 6 at a predetermined position is provided on the device base 81, and the unadjusted head unit 6 is attachable to and detachable from the device base 81 with the nozzle surface 611 facing downward. When the unadjusted head unit 6 is mounted on the device base 81, the head holder 62 is positioned at a reference position.

The length meter 82 is arranged at a position right below the unadjusted head unit 6 mounted on the device base 81. The length meter 82 measures a distance to the nozzle surface 611*c* by irradiating light toward the nozzle surface 611*c* and receiving the light reflected by the nozzle surface 611*c*, and outputs information on this distance to the height controller 83. The height controller 83 having received this information calculates a height position of the nozzle surface 611*c* with respect to the head holder 62 in the height direction Z based on the information on the distance and displays that calculated value on a display. Thus, the operator can precisely grasp the height position of the nozzle surface 611*c* by confirming a numerical value on the display.

To perform the height adjusting operation using the height adjusting device 8, the operator mounts the unadjusted head unit 6 (but already finished with the horizonal/rotational adjustment) on the device base 81 as shown in FIG. 8 (Step S25). Subsequent to that, when the operator instructs the start of an adjustment to the height controller 83, the height position of the nozzle surface 611*c* is displayed on the display as described above. In this way, the operator grasps the current position of the nozzle surface 611*c* in the height direction Z and performs the height adjustment by causing the round tip screws 632 to advance or retreat in the X direction if necessary (Step S26). Note that a specific method for performing the height adjustment of the nozzle surface 611*c* in the height direction Z is as already described. When both the horizontal/rotational adjustment and the height adjustment are completed ("YES" in Step S27), the ink discharge head 61 is fixed to a lower end part of the head holder 62 by the fixing screws 65 (FIG. 2) with the adjusted state maintained (Step S28). The operator removes the head unit 6 completed with the horizontal/rotational adjustment and the height adjustment from the device base 81, thereby completing the manufacturing of the head unit 6.

Referring back to FIG. 3, description is continued. When the manufacturing of one head unit 6 is completed by a series of the operations described above, the operator determines whether or not the number of the adjusted head units 6 has reached the number N of the head units 6 to be attached to the base member 5 (Step S3). While the prepared number of the head units 6 is determined to be less than the number N, the operator repeats Steps S1 and S2. On the other hand, if N head units 6 completed with the horizontal/rotational adjustment and the height adjustment are prepared, the operator attaches the N head units 6 to the base member 5 to manufacture the printing bar (Step S4). An operation procedure of manufacturing the printing bar is described with reference to FIGS. 9 to 11.

Figure 9:
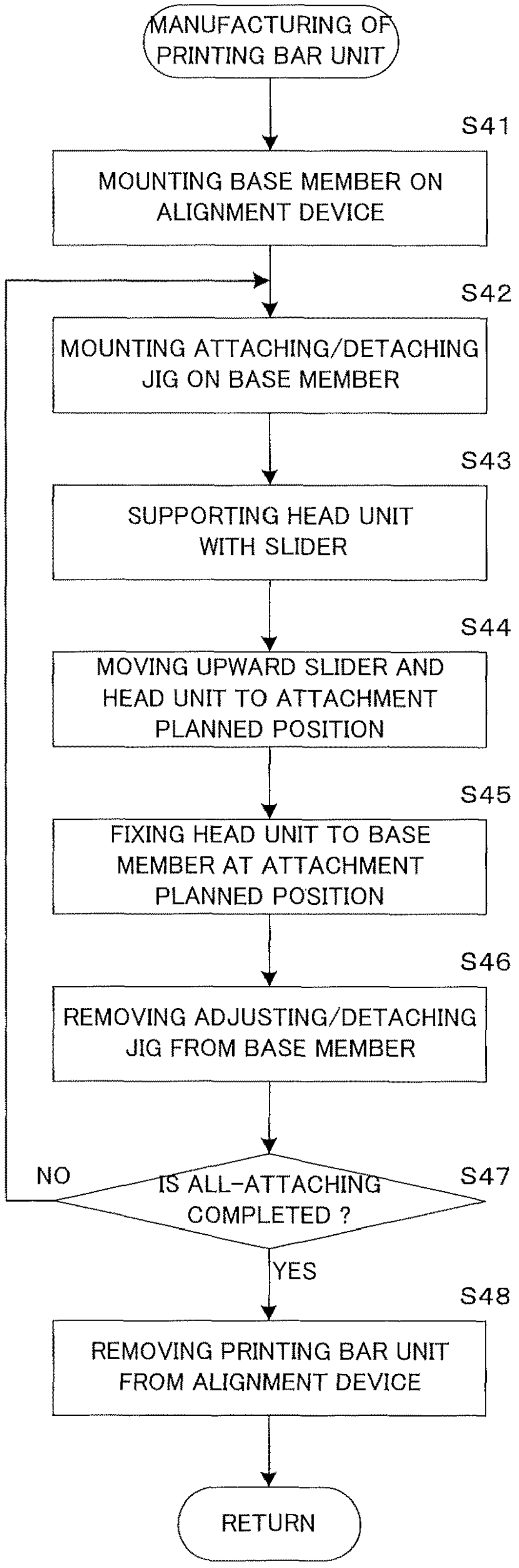
FIG. 9 is a flow chart showing a manufacturing procedure of the printing bar unit
Figure 10:
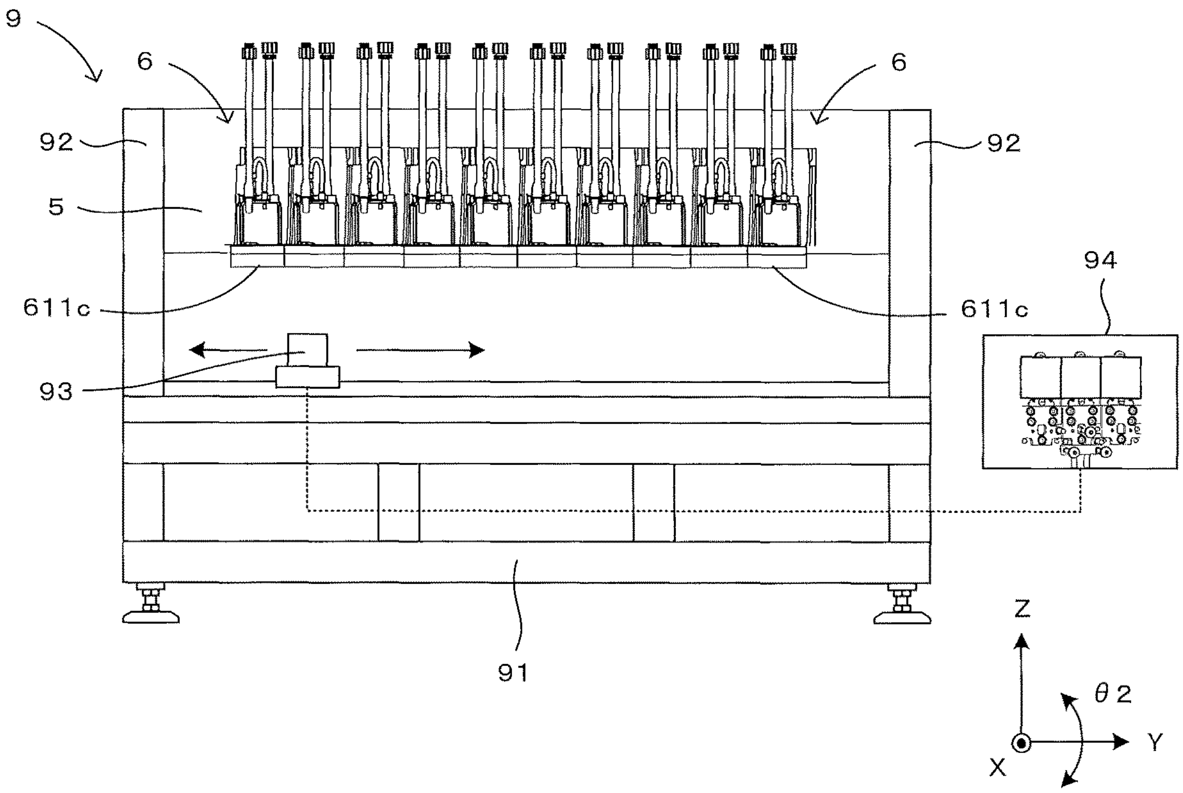
FIG. 10 is a view showing a schematic configuration of an alignment device used in manufacturing the printing bar.
Figure 11:
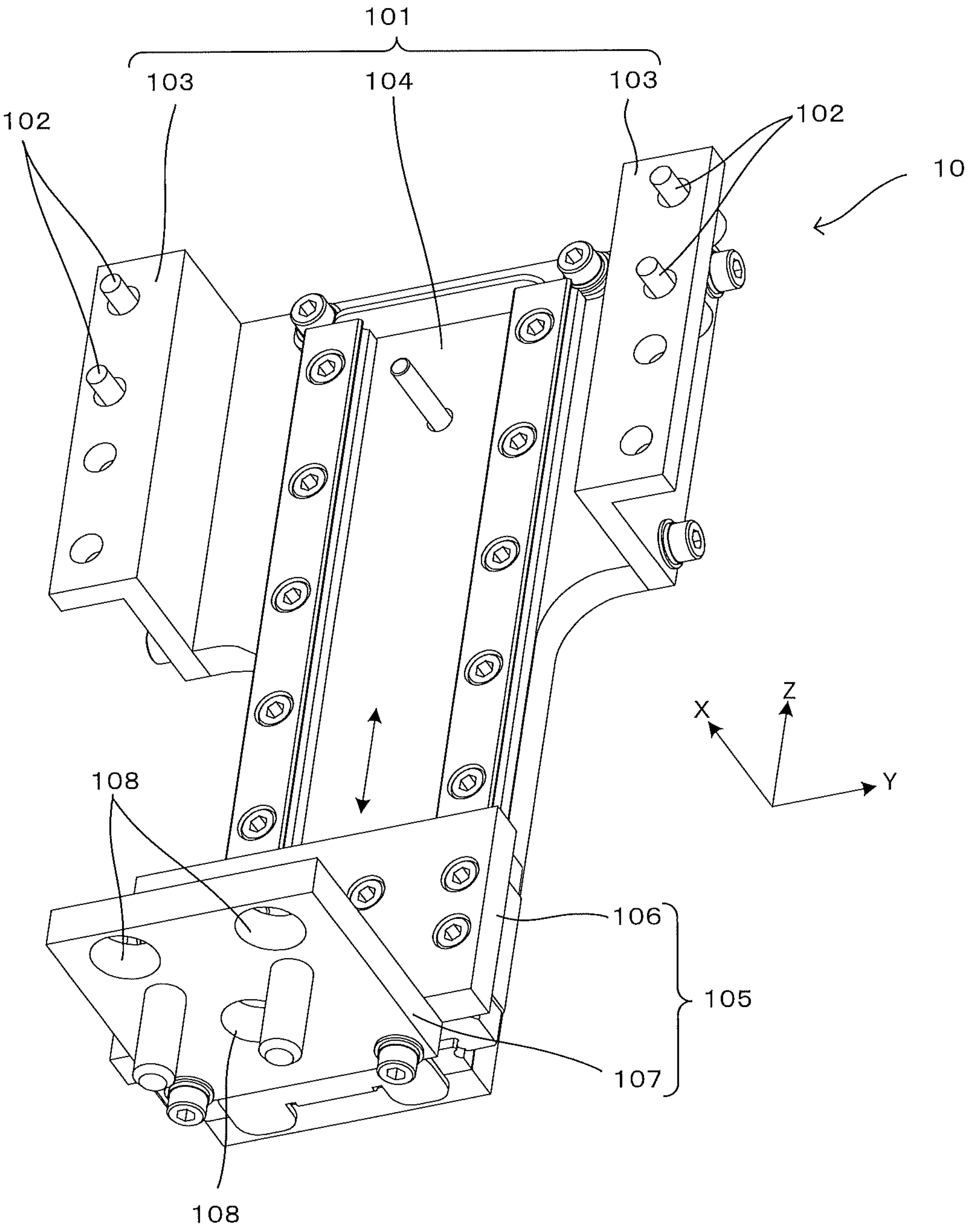
FIG. 11 is a perspective view showing one embodiment of a head unit attaching/detaching jig according to the invention.
Figure 12:
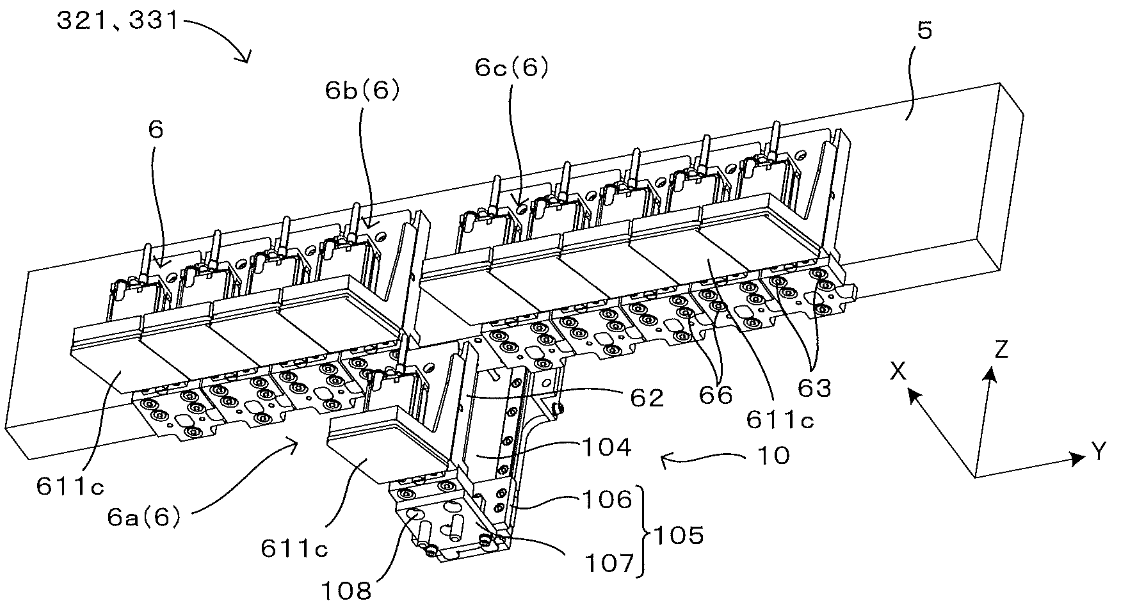
FIG. 12 is a perspective view showing an example of the attachment of the attaching/detaching jig of FIG. 11 to the base member.

FIG. 9 is a flow chart showing a manufacturing procedure of the printing bar unit. FIG. 10 is a view showing a schematic configuration of an alignment device used in manufacturing the printing bar. FIG. 11 is a perspective view showing one embodiment of a head unit attaching/detaching jig according to the invention. FIG. 12 is a perspective view showing an example of the attachment of the attaching/detaching jig of FIG. 11 to the base member. The alignment device 9 used in manufacturing the printing bar unit includes an alignment base 91, a pair of column parts 92, 92, an imager 93 and a display unit 94 as shown in FIG. 10. The pair of column parts 92, 92 stand from the upper surface of the alignment base 91 while being separated in the array direction Y. Upper end parts of these column parts 92, 92 can detachably hold the base member 5 in a horizontal posture. Further, the imager 93 is provided movably in the array direction Y on the upper surface of the alignment base 91. The imager 93 is mounted to face the base member 5 from below and can capture an image of the nozzle surface 611*c* of the head unit 6 attached to the base member 5 and the periphery of the nozzle surface 611*c* as described later. The image captured by the imager 93 is displayed on the display unit 94.

Further, the adjusting/detaching jig 10 is a jig for attaching and detaching the head units 6 to and from the base member 5 one by one. As shown in FIG. 11, the adjusting/detaching jig 10 includes a jig body 101 attachable to and detachable to the base member 5. The jig body 101 includes a pair of mounting members 103 to be mounted on the base member 5 by fasteners 102 such as bolts, and a guide member 104 extending in a sliding direction Z orthogonal to the array direction Y. The mounting members 103 are, for example, attached to the base member 5 to correspond to an attachment planned position where the head unit 6 is attached to the base member 5 as shown in FIG. 12. By this attachment, the guide member 104 extends below the base member 5. A slider 105 capable of supporting the head unit 6 is mounted on the guide member 104, movably in the sliding direction Z. Thus, the head unit 6*a* (see FIG. 12) can be easily and precisely positioned at a desired position of the base member 5 by moving the slider 105 upward (+Z) with the head unit 6*a* supported on the slider 105. Here, if a width of the slider 105 is set to be equal to or less than that of the head unit 6 in the array direction Y, the interference of the slider 105 with the head unit 6 attached to the base member 5 can be effectively prevented. For example, as shown in FIG. 12, the slider 105 supporting the head unit 6*a* facilitates the insertion of the head unit 6*a* between the head units 6*b* and 6*c* or the removal of the head unit 6*a* from between the head units 6*b* and 6*c* without interfering with the head units 6*b*, 6*c* adjacent to the head unit 6*a* on the base member 5.

In this embodiment, the operator manufactures the printing bar unit by attaching the N head units 6 one by one to the base member 5 by the operation procedure shown in FIG. 9 using the alignment device 9 and the adjusting/detaching jig 10 described above (Steps S41 to S48). That is, the base member 5 is mounted on upper end parts of the pair of column parts 92, 92 while being so arranged that a longitudinal direction thereof is parallel to the array direction Y (Step S41). Then, the head units 6 are attached one by one to the base member 5 by the adjusting/detaching jig 10 (Steps S42 to S47). In this attaching operation, the mounting members 103 of the attaching/detaching jig 10 are mounted on the base member 5 by the fasteners 102 to correspond to the attachment planned position of the head unit 6 (Step S42). At this time, as shown in FIG. 11, the guide member 104 extends downward (−Z). Further, the slider 105 descends to a lowermost position of the guide member 104 by its own weight and is locked by an unillustrated stopper. This slider 105 includes a sliding part 106 mounted on the guide member 104 slidably in the (+X) direction and a projecting part 107 projecting in the (+X) direction from the bottom of the sliding part 106. Thus, if the operator places the head unit 6 on the upper surface of the projecting part 107, the slider 105 becomes movable upward along the guide member 104, integrally with the head unit 6, while supporting the head unit 6 from below (Step S43). Accordingly, the slider 105 and the head unit 6 are integrally moved upward to the attachment planned position (Step S44). In this way, the head holder 62 of the head unit 6 is positioned at the attachment planned position while facing the side surface of the base member 5 on the (+X) side. At this time, an image including images of the slider 105 and the head unit 6 supported by the slider 105 is displayed on the display unit 94. Therefore, the operator may position the head unit 6 at the attachment planned position while viewing this image, which is preferable in enhancing operability and positioning accuracy.

Further, in this embodiment, the height adjustment and the posture adjustment have been completed for the nozzle surface 611*c* of the head holder 62 in the head unit 6 as previously described. As a result, for any of the head units 6, the posture and position of the nozzle surface 611*c* are constantly aligned with respect to the base member 5. Of course, the posture and position of the nozzle surface 611*c* may be further adjusted by finely adjusting the head unit 6 with respect to the base member 5 in addition to the positioning operation of the head unit 6 at the attachment planned position. An inkjet head position adjustment method described, for example, in JP 5968632B can be used for the adjustment this time.

When the positioning of the head unit 6 at the attachment planned position is completed, fasteners 66 (FIGS. 2 and 4) such as bolts are inserted toward the head holder 62 from below via three through holes 108 (FIG. 11) penetrating through the projecting part 107 in the vertical direction Z. Then, the fasteners 66 are screwed into the head holder 62 and the base member 5 to fix the head unit 6 to the base member 5 (Step S45). Thereafter, the adjusting/detaching jig 10 is removed from the base member 5 (Step S46).

By this series of steps of the attaching operation (Steps S42 to S46), one head unit 6 is accurately attached to the base member 5. Accordingly, in next Step S47, whether or not all the N head units 6 have been attached to the base member 5 is determined. While there is still any head unit 6 to be attached ("NO" in Step S47), return is made to Step S42 and the above series of steps of the attaching operation are repeated. On the other hand, when all the N head units 6 are attached to complete the printing bar unit, this printing bar unit is removed from the alignment device 9 (Step S48) and the manufacturing of the printing bar unit is finished.

Referring back to FIG. 3, description is continued. The thus manufactured printing bar unit 321 (331) is mounted in the printer 32 (33) (Step S5).

As described above, according to this embodiment, the posture and height position of the nozzle surface 611*c* with respect to the head holder 62 are adjusted in the head unit 6 in an unattached state where the head unit 6 is not attached to the base member 5. That is, the same adjustments are applied to all the N head units 6 before the printing bar unit 321, 331 is manufactured. Thus, discharge performance such as an ink discharge direction and a discharge position becomes consistent among the head units 6 constituting the printing bar unit 321, 331. Moreover, the movable members 631, 641 to 643 adjust the height position and posture of the nozzle surface 611*c* by being brought into contact with the head discharge unit 61. Therefore, the adjustments can be performed more stably and accurately than in the conventional device using spring forces. As a result, excellent print quality is obtained.

Further, the use of the attaching/detaching jig 10 is not essential in manufacturing the printing bar unit 321, 331 by attaching the N head units 6 to the base member 5, but it is preferable since this manufacturing operation can be efficiently and stably performed by using the attaching/detaching jig 10 as in the above embodiment.

As described above, in this embodiment, the round tip screw 632 corresponds to an example of an "adjustment member" of the invention. The movable members 641 to 643 respectively correspond to examples of a "first movable member", a "second movable member" and a "third movable member" of the invention.

The printing bar unit 321, 331 is manufactured by the operation procedure shown in FIG. 9. If one of the head units 6 constituting the printing bar unit 321, 331 breaks down and an exchange is necessary, the use of the attaching/detaching jig 10 shown in FIG. 11 is preferable. For example, as shown in FIG. 12, the head unit 6*a* between the head units 6*b* and 6*c* can be smoothly removed by performing the following operation procedure (a) to (e). That is, a removing operation includes:

(a) The mounting members 103 of the attaching/detaching jig 10 are mounted on the base member 5 at a position corresponding to the head unit 6*a* by the fasteners 102, (b) The empty slider 105 is moved upward to the above position to support the head unit 6*a* by the slider 105, (c) The fixing of the head unit 6 by the fasteners 66 is released, (d) The slider 105 and the head unit 6 are integrally moved downward to the lowermost position (separated position) of the guide member 104 (FIG. 12), and (e) The head unit 6 is removed from the slider 105.

On the other hand, the head unit 6*a* for exchange having the above height adjustment and posture adjustment already performed therefor can be attached between the head units 6*b* and 6*c* by the attaching operation (Steps S42 to S46) of the above embodiment. By combining such removing operation and attaching operation, the head unit 6 can be smoothly and stably exchanged. In this exchange operation, the head unit 6*a* to be removed corresponds to an example of a "first head unit" of the invention, and the head unit 6*a* for exchange corresponds to an example of a "second head unit" of the invention. The position between the head units 6*b* and 6*c* corresponds to an example of an "exchange position" of the invention.

Prior to the above exchange operation, the above adjustments are preferably applied to the head unit 6 for exchange in advance. In this way, the consistency of the discharge performance with the head units 6 used before is ensured and excellent print quality is maintained as it is.

Note that the invention is not limited to the above embodiment and various changes other than the aforementioned ones can be made without departing from the scope of the invention. For example, although both the horizontal/rotational adjustment and the height adjustment are performed in the above embodiment, at least one of them may be performed. Further, in the horizontal/rotational adjustment, only a horizontal adjustment by a movement in the array direction Y or a rotational adjustment by rotation about the axis of rotation AX may be performed.

Figure 14:
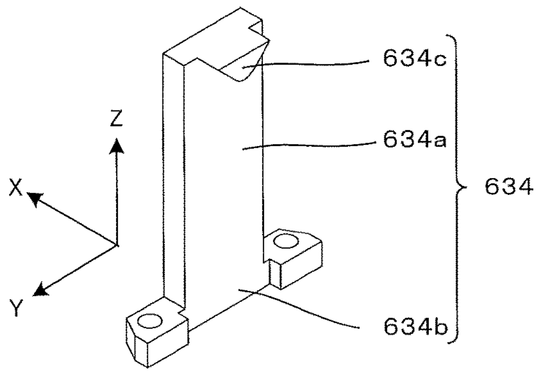
FIG. 14 is a perspective view of the abutting member constituting the height adjustment mechanism shown in FIG. 13.
Figure 15:
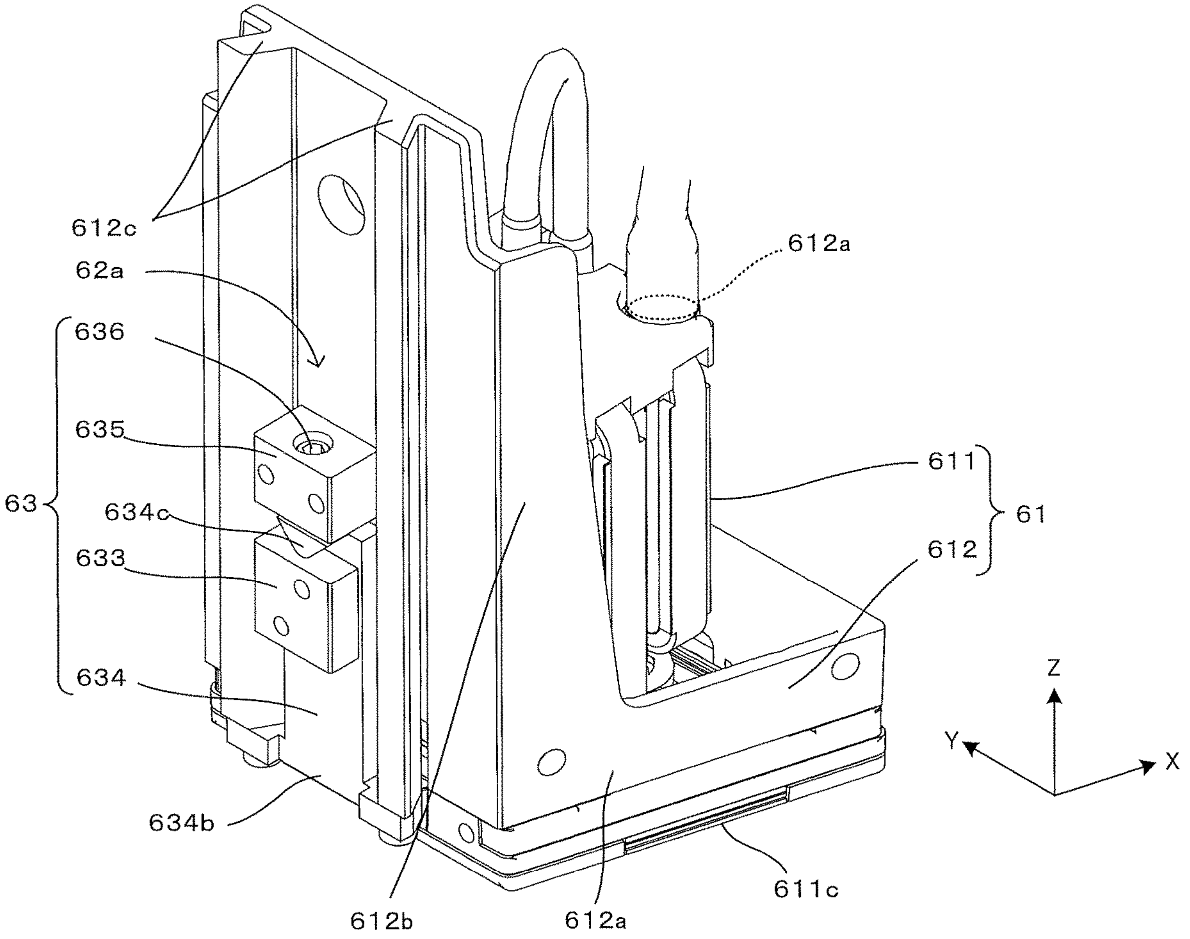
FIG. 15 is a view of the height adjustment mechanism shown in FIG. 13 when viewed from the side of a head holder.

Further, although the height position of the nozzle surface 611*c* with respect to the head holder 62 is adjusted by moving the round tip screw 632 of the height adjustment mechanism 63 back and forth in the X direction in the above embodiment, the configuration of the height adjustment mechanism 63 is not limited to this. For example, as shown in FIGS. 13 to 15, a height adjustment mechanism 63 may be constituted by a movable block 633, an abutting member 646, a support block 635 and a ball plunger 636 (another embodiment).

Figure 13:
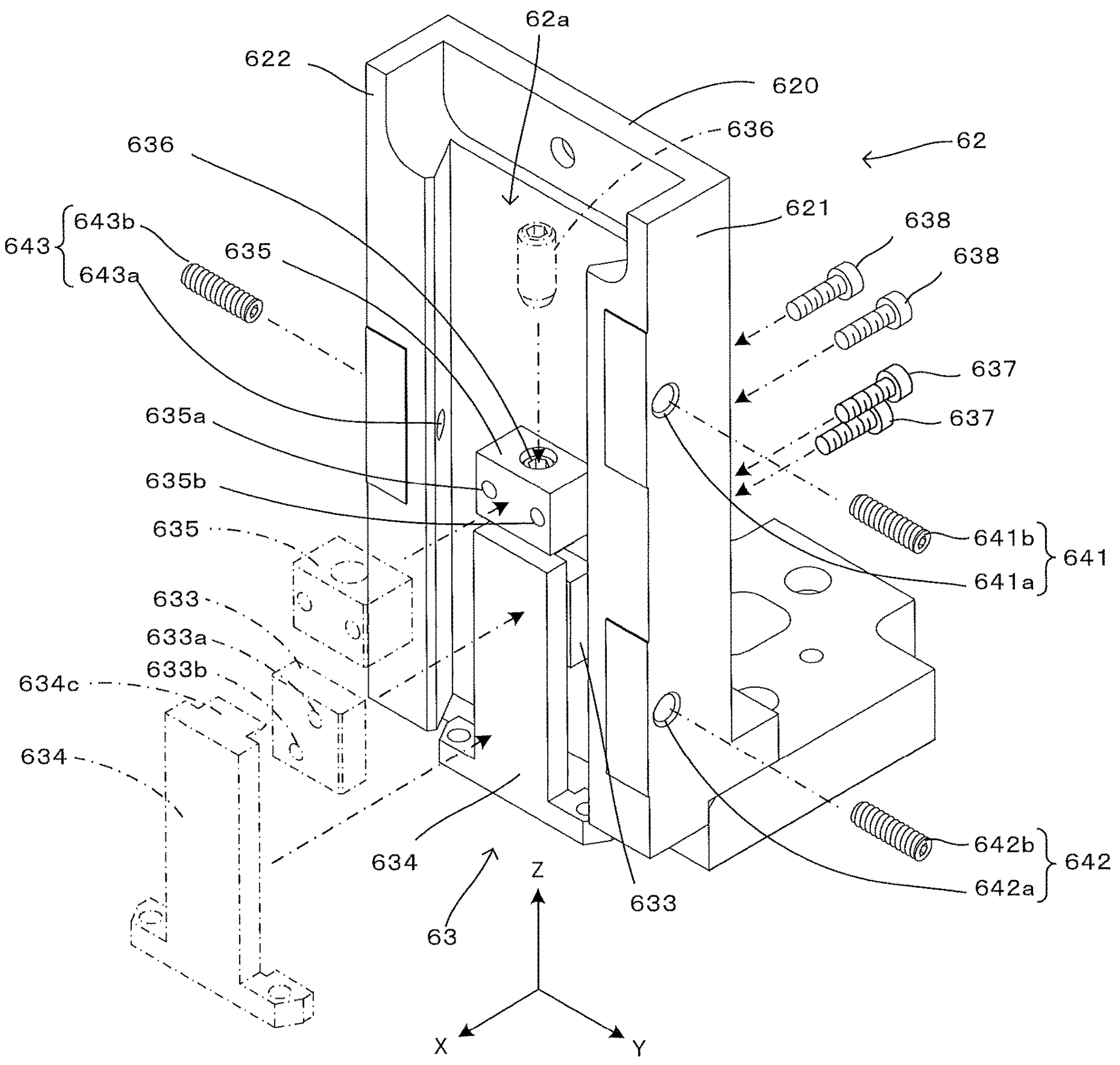
FIG. 13 is a view of the height adjustment mechanism equipped in another embodiment of the head unit according to the invention when viewed from the side of an ink discharge head.

FIG. 13 is a view of the height adjustment mechanism equipped in another embodiment of the head unit according to the invention when viewed from the side of an ink discharge head. FIG. 14 is a perspective view of the abutting member constituting the height adjustment mechanism shown in FIG. 13. FIG. 15 is a view of the height adjustment mechanism shown in FIG. 13 when viewed from the side of a head holder. The ink discharge head 61 is not shown in FIG. 13 to clearly show a positional relationship of the respective components of the height adjustment mechanism 63 with respect to the head holder 62. On the other hand, the head holder 62 is not shown in FIG. 15 to clearly show a positional relationship of the respective components of the height adjustment mechanism 63 with respect to the ink discharge head 61.

In this height adjustment mechanism 63, the movable block 633 is mounted on a holder base 620 from an (+X) side toward a (−X) side as shown in FIG. 13. More specifically, the movable block 633 is provided with two internally threaded parts 633*a*, 633*b*. Two fastening members 637, 637 such as bolts are respectively inserted into through holes (not shown) provided in the holder base 620 from the (−X) side, and externally threaded parts provided on the respective tip parts of the fastening members 637, 637 are threadably engaged with the internal threaded parts 633*a*, 633*b*, whereby the movable block 633 is mounted on the holder base 620. Here, inner diameters of the through holes are set slightly larger than diameters of shaft parts of the fastening members 637, 637. Thus, the mounting position of the movable block 633 can be adjusted in the height direction Z by that diameter difference.

The abutting member 634 is suspended along the holder base 620 on the movable block 633 mounted on this holder base 620 in this way. This abutting member 634 includes an extending part 634*a* extending in the horizontal direction Z as shown in FIG. 14. A lower end part 634*b* of this extending part 634*a* can be coupled to the ink discharge head 61 (see FIG. 15). On the other hand, on an upper end part of the extending part 634*a*, a contact part 534*c* projects in the (−X) direction. A lower end part of the contact part 634*c* is finished into a shape tapered downward. Accordingly, as shown in FIG. 15, the contact part 634*c* of the abutting member 634 comes into contact with the upper surface of the movable block 633 from above, whereby the abutting member 634 is suspended along the holder base 620 in a holding region 62*a* while being coupled to the ink discharge head 61. Therefore, the height position of the ink discharge head 61 can be adjusted with high accuracy by an operator adjusting the mounting position of the movable block 633 in the horizontal direction Z.

The abutting member 634 functions as a "suspension member" of the invention in this way, but the ink discharge head 61 is possibly moved in the height direction Z by an external force if the ink discharge head 61 is only suspended. Accordingly, to stabilize the height position of the ink discharge head 61, the support block 635 and the ball plunger 366 are arranged right above the abutting member 634 in this embodiment. The support block 635 is provided with two internally threaded parts 635*a*, 635*b*. Two fastening members 638, 638 such as bolts are respectively inserted into through holes (not shown) provided in the holder base 620 from the (−X) side and externally threaded parts provided on the respective tip parts of the fastening members 638, 638 are threadably engaged with the internal threaded parts 635*a*, 635*b*, whereby the support block 635 is mounted on the holder base 620 at a position right above the contact part 634*c* of the abutting member 634. The ball plunger 636 is embedded in this support block 635 from the (+Z) direction. A tip part of the ball plunger 636 projects downward from the lower surface of the support block 635 to push the upper surface of the abutting member 634 from above, thereby restricting an upward movement of the abutting member 634. That is, the ball plunger 636 functions as an example of a "restricting member" of the invention, and sandwiches the abutting member 634 in the height direction Z in cooperation with the movable block 633 (corresponding to an example of a "fifth movable member" of the invention). As a result, even if an external force acts on the ink discharge head 61, a variation of the height position of the ink discharge head 61 can be effectively prevented. Note that a round tip screw or the like may be used instead of the ball plunger 636.

This invention can be applied in general to a head unit to be detachably arrayed in a predetermined array direction on a base member and an adjustment method, an attaching/detaching jig and an exchange method for head unit.

Although the invention has been described along with the specific embodiment above, this description is not intended to be interpreted in a limited sense. If the description of the invention is referred to, various modifications of the disclosed embodiment would be apparent to a person skilled in this art, similarly to other embodiments of the invention. Therefore, the appended claims are through to include these modifications or embodiments without departing from the true scope of the invention.

What is claimed is:

1. A head unit to be detachably arrayed in a predetermined array direction on a base member, the head unit comprising:

an ink discharge head having a nozzle surface configured to discharge an ink;

a head holder attachable to and detachable from the base member while holding the ink discharge head in a holding region; and a posture adjustment mechanism configured to adjust a posture of the nozzle surface with respect to the head holder by rotating the ink discharge head with respect to the head holder about an axis of rotation perpendicular to both a surface normal to the nozzle surface and the array direction in a state where the head holder is not attached to the base member, wherein:

the head holder includes a first holder member provided on one side of the holding region and a second holder member provided on the other side of the holding region in the array direction, the posture adjustment mechanism includes:

a first movable member and a second movable member provided movably back and forth from and to the holding region with respect to the first holder member, the first and second movable members coming into contact with the ink discharge head located in the holding region by projecting into the holding region; and a third movable member provided movably back and forth from and to the holding region with respect to the second holder member while facing an intermediate part of the first holder member located between the first and second movable members, the third movable member coming into contact with the ink discharge head located in the holding region by projecting into the holding region, and a rotation amount of the ink discharge head about the axis of rotation is adjusted as a projection amount of one of the first and second movable members into the holding region is increased and a projection amount of the other into the holding region is reduced.

2. The head unit according to claim 1, wherein the posture adjustment mechanism:

moves the ink discharge head toward the second holder member by increasing the projection amounts of the first and second movable members into the holder member and reducing the projection amount of the third movable member into the holding region, and moves the ink discharge head toward the first holder member by reducing the projection amounts of the first and second movable members into the holder member and increasing the projection amount of the third movable member into the holding region.

3. The head unit according to claim 1, further comprising a height adjustment mechanism configured to adjust a height position of the nozzle surface with respect to the head holder by relatively moving the ink discharge head with respect to the head holder in a height direction parallel to the surface normal to the nozzle surface in the state where the head holder is not attached to the base member.

4. The head unit according to claim 3, wherein:

the head holder includes a holder base attachable to and detachable from the base member, and the height adjustment mechanism includes a fourth movable member mounted on the holder base movably in the height direction and a mover configured to move the fourth movable member in the height direction, and a relative position of the nozzle surface with respect to the head holder in the height direction is adjusted by moving the fourth movable member by the mover with one end part of the fourth movable member in the height direction held in contact with the ink discharge head.

5. The head unit according to claim 4, wherein:

the other end part of the fourth movable member is finished into an inclined surface inclined with respect to the height direction, and the mover includes an adjustment member configured to adjust a position of the fourth movable member in the height direction by moving along a direction orthogonal to the height direction while causing a tip part to slide in contact with the inclined surface.

6. The head unit according to claim 3, wherein:

the head holder includes a holder base attachable to and detachable from the base member, the height adjustment mechanism includes:

a fifth movable member to be mounted on the holder base movably in the height direction; and a suspension member to be suspended along the holder base while being coupled to the ink discharge head by coming into contact with an upper surface of the fifth movable member mounted on the holder base from above, and the suspension member is displaced in the height direction according to a mounting position of the fifth movable member, thereby adjusting a relative position of the nozzle surface with respect to the head holder in the height direction.

7. The head unit according to claim 6, wherein:

the suspension member includes a contact part configured to come into contact with the upper surface of the fifth movable member, and the height adjustment mechanism further includes a restricting member configured to restrict an upward movement of the suspension member by pressing the contact part of the suspension member suspended on the fifth movable member from above.

8. A head unit to be detachably arrayed in a predetermined array direction on a base member, the head unit comprising:

an ink discharge head having a nozzle surface configured to discharge an ink;

a head holder attachable to and detachable from the base member while holding the ink discharge head in a holding region; and a height adjustment mechanism configured to adjust a height position of the nozzle surface with respect to the head holder by moving the ink discharge head with respect to the head holder in a height direction parallel to a surface normal to the nozzle surface in a state where the head holder is not attached to the base member, wherein:

the head holder includes a holder base attachable to and detachable from the base member, and the height adjustment mechanism includes a fourth movable member mounted on the holder base movably in the height direction and a mover configured to move the fourth movable member in the height direction, and a relative position of the nozzle surface with respect to the head holder in the height direction is adjusted by moving the fourth movable member by the mover with one end part of the fourth movable member in the height direction held in contact with the ink discharge head.

9. The head unit according to claim 8, wherein:

the other end part of the fourth movable member is finished into an inclined surface inclined with respect to the height direction, and the mover includes an adjustment member configured to adjust a position of the fourth movable member in the height direction by moving along a direction orthogonal to the height direction while causing a tip part to slide in contact with the inclined surface.

10. A head unit to be detachably arrayed in a predetermined array direction on a base member, the head unit comprising:

an ink discharge head having a nozzle surface configured to discharge an ink;

a head holder attachable to and detachable from the base member while holding the ink discharge head in a holding region; and a height adjustment mechanism configured to adjust a height position of the nozzle surface with respect to the head holder by moving the ink discharge head with respect to the head holder in a height direction parallel to a surface normal to the nozzle surface in a state where the head holder is not attached to the base member, wherein:

the head holder includes a holder base attachable to and detachable from the base member, the height adjustment mechanism includes:

a fifth movable member to be mounted on the holder base movably in the height direction; and a suspension member to be suspended along the holder base while being coupled to the ink discharge head by coming into contact with an upper surface of the fifth movable member mounted on the holder base from above, and the suspension member is displaced in the height direction according to a mounting position of the fifth movable member, thereby adjusting a relative position of the nozzle surface with respect to the head holder in the height direction.

11. The head unit according to claim 10, wherein:

the suspension member includes a contact part configured to come into contact with the upper surface of the fifth movable member, and the height adjustment mechanism further includes a restricting member configured to restrict an upward movement of the suspension member by pressing the contact part of the suspension member suspended on the fifth movable member from above.

12. A head unit adjustment method for adjusting a head unit to be detachably arrayed in a predetermined array direction on a base member, the method comprising:

(a) inserting an ink discharge head having a nozzle surface configured to discharge an ink into a holding region of a head holder;

(b1) adjusting a posture of the nozzle surface with respect to the head holder by rotating the ink discharge head inserted into the holding region with respect to the head holder about an axis of rotation perpendicular to a surface normal to the nozzle surface and the array direction; and (c) fixing the ink discharge head to the head holder to form the head unit after the step (b1) is performed, the operation (a), the operation (b1) operation and the (c) operation performed before the head unit is attached to the base member, wherein the head holder includes a first holder member provided on one side of the holding region and a second holder member provided on the other side of the holding region in the array direction, the posture adjustment mechanism includes:

a first movable member and a second movable member provided movably back and forth from and to the holding region with respect to the first holder member, the first and second movable members coming into contact with the ink discharge head located in the holding region by projecting into the holding region; and a third movable member provided movably back and forth from and to the holding region with respect to the second holder member while facing an intermediate part of the first holder member located between the first and second movable members, the third movable member coming into contact with the ink discharge head located in the holding region by projecting into the holding region, and a rotation amount of the ink discharge head about the axis of rotation is adjusted as a projection amount of one of the first and second movable members into the holding region is increased and a projection amount of the other into the holding region is reduced.

13. The head unit adjustment method according to claim 12, comprising, before the head unit is attached to the base member:

(b2) adjusting a height position of the nozzle surface with respect to the head holder by moving the ink discharge head inserted into the holding region with respect to the head holder in a height direction parallel to the surface normal to the nozzle surface, the operation (b2) performed before the head unit is attached to the base member, wherein the operation (c) is performed after both the operation (b1) and the operation (b2) are performed.

14. A head unit adjustment method for adjusting a head unit to be detachably arrayed in a predetermined array direction with respect to a base member, the method comprising:

(a) inserting an ink discharge head having a nozzle surface configured to discharge an ink into a holding region of a head holder;

(b2) adjusting a height position of the nozzle surface with respect to the head holder by moving the ink discharge head inserted into the holding region with respect to the head holder in a height direction parallel to a surface normal to the nozzle surface; and (c) fixing the ink discharge head to the head holder so as to form the head unit after the operation (b2) is performed, wherein the operation (a), the operation (b2) operation and the (c) operation performed before the head unit is attached to the base member, the head holder includes a holder base attachable to and detachable from the base member, and the height adjustment mechanism includes a fourth movable member mounted on the holder base movably in the height direction and a mover configured to move the fourth movable member in the height direction, and a relative position of the nozzle surface with respect to the head holder in the height direction is adjusted by moving the fourth movable member by the mover with one end part of the fourth movable member in the height direction held in contact with the ink discharge head.

15. A head unit adjustment method for adjusting a head unit to be detachably arrayed in a predetermined array direction with respect to a base member, the method comprising:

(a) inserting an ink discharge head having a nozzle surface configured to discharge an ink into a holding region of a head holder;

(b2) adjusting, using a height adjustment mechanism, a height position of the nozzle surface with respect to the head holder by moving the ink discharge head inserted into the holding region with respect to the head holder in a height direction parallel to a surface normal to the nozzle surface; and (c) fixing the ink discharge head to the head holder so as to form the head unit after the operation (b2) is performed, wherein the operation (a), the operation (b2) operation and the (c) operation performed before the head unit is attached to the base member, the head holder includes a holder base attachable to and detachable from the base member, the height adjustment mechanism includes:

a fifth movable member to be mounted on the holder base movably in the height direction; and a suspension member to be suspended along the holder base while being coupled to the ink discharge head by coming into contact with an upper surface of the fifth movable member mounted on the holder base from above, and the suspension member is displaced in the height direction according to a mounting position of the fifth movable member, thereby adjusting a relative position of the nozzle surface with respect to the head holder in the height direction.

* * * * *